Inventor
Thomas A. Hutsell

By Herbert E. Smith
Attorney

May 26, 1925.

T. A. HUTSELL 1,539,315

INTERNAL COMBUSTION ENGINE

Filed Jan. 27, 1921

Inventor
Thomas A. Hutsell

By Herbert E. Smith
Attorney

Patented May 26, 1925.

1,539,315

UNITED STATES PATENT OFFICE.

THOMAS A. HUTSELL, OF SPOKANE, WASHINGTON, ASSIGNOR TO HUTSELL MOTOR COMPANY, OF SPOKANE, WASHINGTON.

INTERNAL-COMBUSTION ENGINE.

Application filed January 27, 1921. Serial No. 440,279.

*To all whom it may concern:*

Be it known that I, THOMAS A. HUTSELL, a citizen of the United States, residing at Spokane, in Spokane County and State of Washington, have invented certain new and useful Improvements in Internal-Combustion Engines, of which the following is a specification.

My present invention relates to improvements in internal combustion engines of the two cycle type involving co-axial working and compression cylinders and pistons, and embodies certain novel combinations and arrangements of parts especially relating to the intake and exhaust ports and their connections with the combustion chamber of the cylinder whereby the fuel charge is heated and thus enhanced by the exhaust gases of combustion. The invention contemplates also the peculiar construction of the gas intake manifold for equalizing the pressure of and distribution in a uniform manner of the fuel charges to their respective cylinders. And further the invention embodies a novel formation of intake ports in the cylinders to the compression chambers thereof for uniformly controlling the admission of the charge to the cylinders. Another improvement to the internal combustion engine resides in the system of lubricating the operating parts of the engine, while other features of construction and operation will be pointed out hereinafter more in detail, and set forth in the appended claim.

The invention consists essentially in certain novel combinations and arrangements hereinafter described and claimed whereby the structure is reduced to a minimum number of parts and the construction and operation of the engine thus simplified, its durability increased, reliability is insured, and economy in gas consumption is accomplished, together with added efficiency in this type of engine for the production of power.

In the accompanying drawings I have illustrated one complete example of the physical embodiment of a four cylinder motor or internal combustion engine having complementary co-axial working and pump cylinders and pistons, in which the individual engines are arranged in pairs and alternately supplied with fuel charges compressed in one pump cylinder and transferred to the combustion chamber of a complementary working cylinder through a communicating manifold. While I have illustrated a four cylinder type of motor it will be understood that the subject matter of the invention is equally well adapted for use in connection with motors or internal combustion engines of the two, six, or eight cylinder types, and such adaptations are contemplated without involving changes beyond the scope of my claims.

Figure 2:
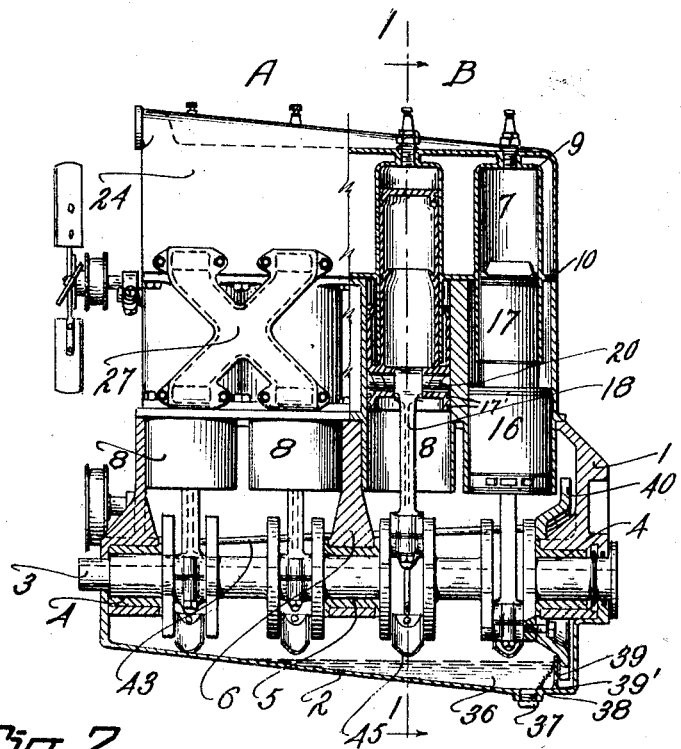
Figure 2 is a view in side elevation partly in section, of a four cylinder engine, showing the crossed intake manifold for fuel charges, the lubricating or oiling system, and the operating parts of the engine both in section and elevation.
Figure 3:
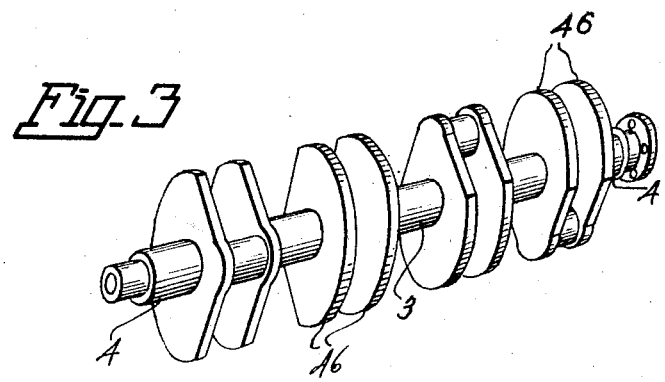
Figure 3 is a perspective view of the crank shaft of the engine, detached, illustrating the counterbalancing disks or plates that are instrumental and utilized in the distribution of the lubricant from the oil casing or well.

In the four cylinder engine or motor illustrated in Figure 2 the cylinders are arranged in parallel pairs as A and B, and all supported upon the engine base 1 and crank case 2 in which the crank shaft 3 is journaled as usual in bearings 4, 4 at the ends of the shaft, and the shaft is further provided with an intermediate bearing 5 in the transverse web or partition 6 of the engine base.

Figure 4:
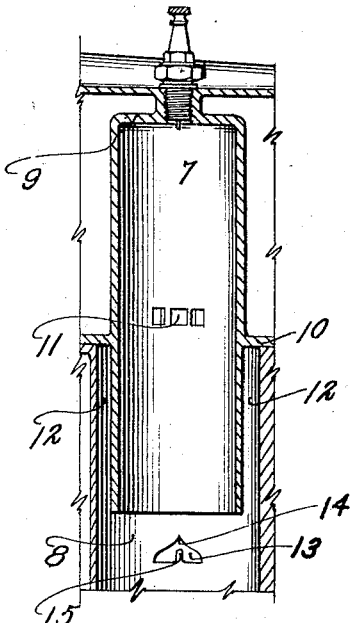
Figure 4 is a vertical sectional view of one of the combined co-axial working and pump cylinders of the engine illustrating the intake and exhaust ports therein.

As best seen at the right in Figures 2 and 4, each engine is equipped with a co-axial working cylinder 7 and a pump or compression cylinder 8, both open at their lower ends and closed at their upper ends, as by the head 9 and flange 10 of the respective cylinders.

Within the walls of the working cylinder are provided the exhaust ports 11 of usual construction, and below the annular space 12 of the pump cylinder, which is formed exterior of the lower end of the working cylinder, I use a special form of intake port 13. In Figure 4 it will be noted that the port 13 is of an inverted, somewhat V-shape with the apex 14 of the opening at the upper end, and a central tongue 15 is located directly therebeneath. The inverted V-shape of the port is such that as the pump piston 16 descends and its upper edge passes over the port a small opening will be uncovered, which is gradually enlarged with the movement of the piston, and a vacuum is thus created in the annular space 12 of the compression chamber of the engine. The suction through the port would, under ordinary conditions be exceedingly strong, resulting in an undesirable rush of the fuel charge, but because of the peculiar formation of the port in increasing the area of the port, the admission of the fuel charge is gradually increased as the piston moves to the bottom of its stroke when the full charge will have been admitted through the port. This arrangement of the port tends to prevent a sudden and excessive drawing of the fuel charge from the carbureter of the engine, and the control of the admitted pressure through the port overcomes this movement of the fuel gas, thus providing for a smooth and regular admission of gas to the compression or pump cylinder.

The coaxial pistons include a compression or pump piston 16, and the smaller working piston 17, the former reciprocable in the compression chamber 8 and the latter operable in the working cylinder 7. As shown the lower end of the working cylinder 7 extends down into the compression chamber 8 for the purpose of confining the bottom rings 17' of the working piston 17 in all positions of the working piston. This construction insures a positive air or gas lock or seal between the lower pump cylinder and the ports in the wall of the working cylinder. The connecting rods 18 are journaled as usual on the crank shaft at 19 and coupled by the wrist pins 20 within the lower open ends of the pistons 16, and usual packing rings are provided for the pistons in the several cylinders.

The pistons 16—17 are each composed of an integral structure, the pump piston being formed as a tubular extension of the transverse flange 21 which closes the annular space 22 between the lower end of the working piston and the pump piston, and this space 22 co-acts with the complementary space 12 of the cylinder 8 to form the compression chamber for the fuel charge.

Figure 1:
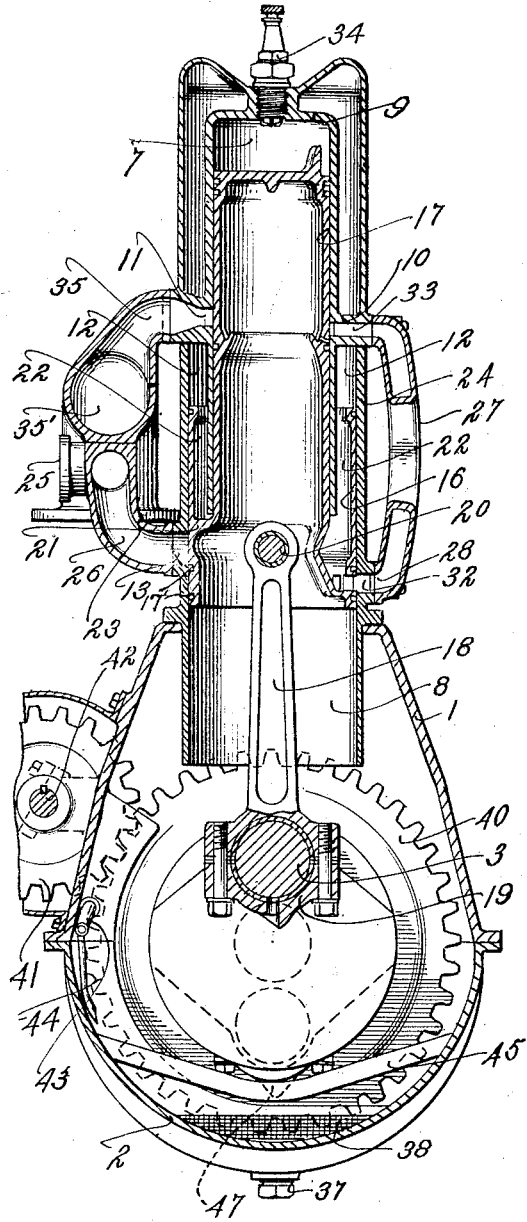
Figure 1 is a vertical sectional view through an engine or motor involving my invention, at line 1—1 of figure 2.
Figure 5:
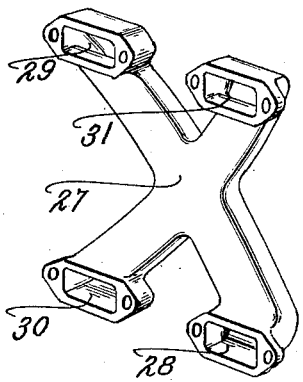
Figure 5 is a perspective view of one of the crossed fuel charge intake manifolds with which each pair of engines is equipped.

The intake manifold casting 23 is preferably in one piece, and flanged for attachment to the engine bloc 24, as shown in Figure 1, where the intake 25 is indicated as receiving the fuel charge from the carbureter not shown. From the intake 25 a pair of downwardly extending curved passages 26, one of which is shown in Figure 1, diverge and communicate with the inlet ports 13 of the compression cylinders of the engines of a pair as A and B in Figure 2, and by the action of the compression piston, on its downward stroke the fuel charge is drawn into the compression or pump cylinder through the inlet port 13 as previously described. Upon the return or upward stroke of the compression piston, the admitted gas is compressed in the annular spaces 12 and 22 forming the compression chamber, and at the end of this stroke the compressed fuel charge is introduced into the transfer manifold 27, indicated in Figure 5 of the drawings. The transfer manifold for the fuel charge is in the form of a cross with complementary inlet ports and outlet ports 28—29 and 30—31 at the respective ends thereof, and the four tubular legs of the manifold communicate at the central portion thereof in order to insure a commingling of the gas currents as they pass through the manifold. Thus at 32 in Figure 1 the outlet port from the compression cylinder is shown communicating with inlet port 28 of the transfer manifold, and a similar port 32 communicates with the port 30 of the transfer manifold of the complementary compression cylinder. By this joint communication with the two compression cylinders of the pair as A or B of engines the alternating movement of the pistons in their respective cylinders transfers the fuel charge from the compression cylinder of one engine to the working cylinder of the complementary parallel engine, and the movement of gases through the transfer manifold is thus accomplished with uniformity and its distribution to the working cylinders is equalized. The inlet to the working cylinders is indicated at 33 in Figure 1, from the manifold 27, and the admitted chrage to this cylinder is compressed and fired in the combustion chamber from the spark plug 34 as usual.

Upon the downward stroke of the working piston the spent gases pass through the exhaust port 11 of the working cylinder and thence through the exhaust chamber 35 of the intake manifold casting 23, and are disposed of through the exhaust outlet 35' at the left in Figure 1. In this connection it will be noted that the exhaust gases of combustion pass in close proximity to the incoming fresh fuel charge, and as the exhaust gases heat the metal forming the walls of the exhaust chamber 35 and outlet 35' the heat is radiated to the intake portion of the manifold. The heated intake manifold thus heats the incoming fresh fuel charge before it is passed to the compression cylinder to render more efficient the fuel charge.

The lubrication of the operating parts of the motor is accomplished from the oil basin 2 which is formed with an inclined bottom to provide a sump 36 or depression at one end thereof, from which the oil may be drained by the cock 37 as usual.

Adjacent to the cock, in the sump, a screen 38 is provided, and the integral flange or partition 39 forms an oil well at the end of the oil casing through which oil is passed by way of the opening 39' in the partition from the sump. Within the oil well the driving gear 40 is located and its teeth dip into the oil in the well. The gear is fixed to revolve with the crank shaft and meshes with a driven pinion 41 on the shaft 42, located parallel with the crank shaft and driven therefrom to operate the pump, generator, fan pulleys and other auxiliaries of the motor. By the illustrated arrangement of the gear and pinion, the oil is dipped by the teeth of the gear from the oil well and carried on the teeth of the gear as it revolves, and the oil dropped or spilled into the open end of an oil distributing pipe 43 extending longitudinally of the oil casing of the engine and with the receiving end elevated. The pipe 43 forms a gravity conveyer for the oil furnished thereto from the gearing, and by means of the transversely arranged branch pipes 44 projected at regular intervals from the main distributing pipe, the oil is deposited in the several oil trays or pans 45, located transversely of the oil casing, one below each of the journals of the connecting rods 18, and between the counterbalancing blades or disks 46 of the crank shaft 3. A projection 47 may be provided on the extremity of each of the crank shaft journals of the connecting rods, and as these projections dip into the oil trays at each revolution of the crank shaft the oil is lifted from the trays and splashed into the lower open ends of the cylinders, caught up by the reciprocating pistons, and thence distributed in usual manner. By this arrangement of parts the supply of oil is maintained in circulation and as the oil drips from the cylinders into the oil casing, the liquid is gathered in the sump 36, passes through the screen 38, is caught up by the revolving gear wheel 40 and passed to the oil pipes for distribution to the several trays 45, and again used in the cylinders as described.

Having thus fully described my invention, what I claim as new and desire to secure by Letters Patent is—

The combination in an internal combustion engine with a pair of co-axial compression and working cylinders and complementary compression and working pistons, said working cylinder having an extension within the compression cylinder below the bottom rings of the working piston, of a manifold casting having an intake port to each compression cylinder and a closely related exhaust port from each working cylinder, and a transfer manifold comprising intercepting tubular structures having communicating outlet ports from said compression chambers and communicating inlet ports to said working cylinders, for the purpose described.

In testimony whereof, I affix my signature.

THOMAS A. HUTSELL.